United States Patent
Rempt

[11] Patent Number: 5,957,330
[45] Date of Patent: Sep. 28, 1999

[54] BOTTLE TOP DISPENSER

[75] Inventor: Renate Rempt, Wertheim-Nassig, Germany

[73] Assignee: Brand GmbH + Co., Germany

[21] Appl. No.: 08/967,514

[22] Filed: Nov. 11, 1997

[30] Foreign Application Priority Data

Nov. 16, 1996 [DE] Germany ............ 196 47 491

[51] Int. Cl.[6] .................................................. B67D 5/22
[52] U.S. Cl. ........................ 222/31; 222/41; 222/309
[58] Field of Search ............................. 222/31, 41, 43, 222/309, 386

[56] References Cited

U.S. PATENT DOCUMENTS

| | | |
|---|---|---|
| 4,072,247 | 2/1978 | Yamazaki ............... 222/309 |
| 4,074,831 | 2/1978 | Roach. |
| 4,159,784 | 7/1979 | D'Autry. |
| 4,395,921 | 8/1983 | Oppenlander ............ 222/309 |

FOREIGN PATENT DOCUMENTS 0086912 4/1982 European Pat. Off. .
0339614 4/1989 European Pat. Off. .

*Primary Examiner*—Philippe Derakshani
*Attorney, Agent, or Firm*—Galgano & Burke

[57] ABSTRACT

The bottle top dispenser has a piston-cylinder unit, the piston (12) and cylinder (10) of which can be activated in an axial stroke movement relative to one another, in order to draw liquid from a bottle on which the dispenser is set, and dispense it. The maximum axial elongation of the piston (12) and cylinder (10) relative to one another is adjusted with a limiter. The dispenser has a volume display proportional to the limiter setting. The dispenser can be adjusted, by setting it, in a condition where the limiter and the volume display are independent of one another, in order to bring the displayed volume and the volume actually dispensed into agreement.

10 Claims, 1 Drawing Sheet

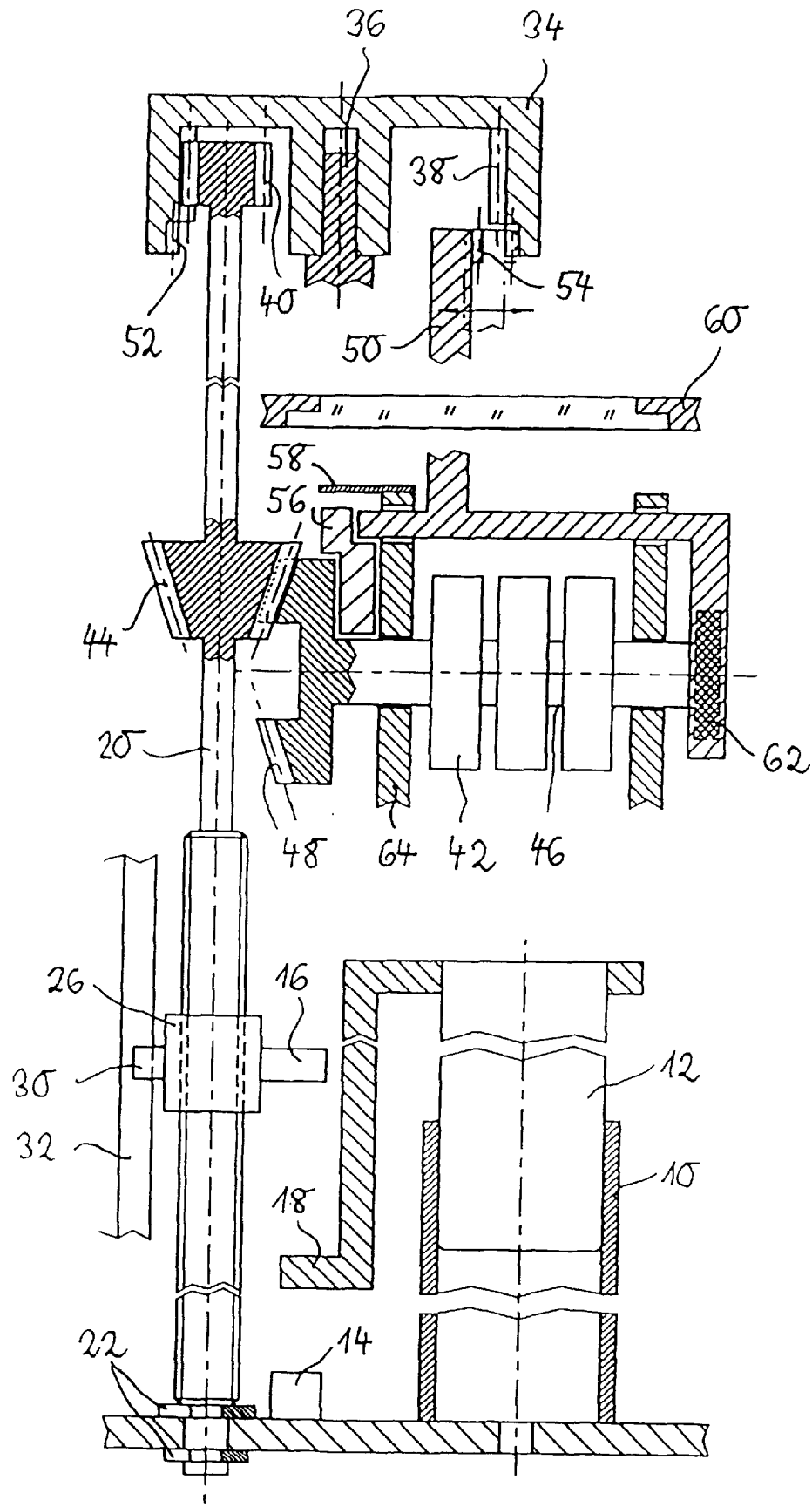

BOTTLE TOP DISPENSER

BACKGROUND OF THE INVENTION

The invention relates to a bottle top dispenser with a piston-cylinder unit, the piston and cylinder of which can be activated in an axial stroke movement relative to one another, in order to draw liquid from a bottle on which the dispenser is set, and dispense it, with an adjustable limiter for the maximum axial elongation of the piston and cylinder relative to one another, and with a volume display proportional to the limiter setting.

SUMMARY OF THE INVENTION

Such a bottle top dispenser is known from practice. For a digital volume display, it has a mechanical counter mechanism which is connected, via a mechanical gear system, with an adjustable stop that acts as a limiter of the piston-cylinder stroke. The gear connection is rigid. For the user, there is therefore no possibility of adjusting the dispenser in order to bring the volume of liquid which is displayed and that which is actually dispensed into agreement.

It is the task of the invention to create an adjustable dispenser of the type indicated initially.

This task is accomplished, in such a dispenser, in that the dispenser is adjustable, by setting it, in a condition where the limiter and the volume display are independent of one another, in order to bring the displayed volume and the volume actually dispensed into agreement.

It must be noted that the term "limiter" is not restricted to an adjustable stop, but rather refers to any functional element which limits the maximum axial elongation or, to put it another way, the maximum axial in and out movement distance of the piston and cylinder relative to one another, in the one direction or the other, or in both directions. The limiter is therefore a stroke distance limiter.

The adjustability by means of setting means that the dispenser has a setting element which undergoes a setting change during the adjustment.

In a preferred embodiment, the limiter acts mechanically. Likewise, the volume display is mechanical. A mechanical gear connection exists between the limiter and the volume display, and this connection can be uncoupled and recoupled for purpose of adjustment.

It must be noted that the invention is not limited to this mechanical variant. The limiter for the maximum axial elongation of the piston and cylinder can also act electrically, electronically, optically, or acoustically, and its setting can be detected electrically, electronically, optically, or acoustically, and displayed digitally. The adjustment in a condition where the limiter and the digital volume display are uncoupled from one another can therefore be understood also as being electrical, electronic, optical, or acoustic. In particular, the case of subsequently adjusting the electronic volume display to the actual volume dispensed, in that the display value is changed by data entry, e.g. via a keyboard, without any mechanical uncoupling of the limiter and volume display being required, since they are not mechanically coupled, is meant to be included.

In the mechanical variant, the limiter preferably has a first stop, which limits the piston-cylinder stroke during intake, and a second stop, which limits the piston-cylinder stroke while dispensing. To make an adjustment, the first stop or the second stop or the volume display can be adjusted for making an adjustment in the uncoupled state of the limiter and the volume display.

In a preferred embodiment, one of the stops is an adjustable stop for volume adjustment. To make an adjustment, the adjustable stop is held in place in the uncoupled state of the limiter and the volume display, and the volume display is adjusted. This is particularly practical since the user can measure the volume actually dispensed and set the volume display accordingly, in a single step. Holding the adjustable stop in place assures that its setting is not changed during the adjustment. In other words, the volume display is only brought into agreement with the volume actually dispensed.

In a preferred embodiment, the dispenser has a rotating knob for adjusting the volume, on which a gear crown is arranged. The volume display is located behind a closure which must be opened to make the adjustment. When the closure is opened, a lug or the like which is located on it moves into the gear crown of the rotating knob and locks it in place.

In a preferred embodiment, the volume display is achieved by means of a counter mechanism, the counter mechanism shaft of which is coupled, via a bevel wheel gear, to a threaded spindle, which is subject to a rotation proportional to the limiter setting. The counter mechanism shaft is locked in place by means of a removable spacer, in the engagement position of the bevel gears. It can be moved out of engagement with the bevel gears after the spacer has been released, and can be turned by means of a setting knob.

In a preferred embodiment, the dispenser has a seal which is broken at the first adjustment. After the seal is broken, a noticeable marking becomes visible in the volume display field of the dispenser, in order to signal to the user that the volume display deviates from the basic adjustment provided by the manufacturer, for which there is a conformity certification. This can be important for possible warranty claims, for example.

In a preferred embodiment, the spacer is secured with a plastic strip, which is torn off when the spacer is first released, and allows the marking to become visible.

In a preferred embodiment, the plastic strip is located in the volume display field of the dispenser, in front of the spacer, so that it covers the latter. After the plastic strip is torn off, the spacer itself becomes visible as a marking. In order to achieve the desired signal effect, the spacer preferably consists of a material which clearly differs in color from the volume display field and the plastic strip.

BRIEF DESCRIPTION OF THE DRAWINGS

The invention will be explained in greater detail below, on the basis of an exemplary embodiment shown in the drawing. The functional schematic of a bottle top dispenser, partially in cross-section, is shown in FIG.1.

DETAILED DESCRIPTION OF THE PREFERRED AND ILLUSTRATED EMBODIMENTS

The bottle top dispenser has a cylinder 10 and a piston 12 which is arranged to move axially within it. When the piston 12 is moved out of the cylinder 10, liquid is drawn from a bottle on which the dispenser is set, into the cylinder 10. When the piston 12 moves back into the cylinder 10, the liquid is transported out of the cylinder 10 to an outlet, and dispensed. The piston movement occurs by hand. A certain setting stroke of the piston 12 is predetermined, corresponding to the desired dispensing volume of liquid.

The setting stroke of the piston 12 is limited by stops 14, 16, which interact with a counter-stop 18 which is affixed on the piston 12. The stop 14 which limits the inward movement of the piston 12 into the cylinder 10 for the purpose of dispensing liquid is a fixed stop 14, rigidly connected with the cylinder 10. The stop 16 which limits the outward movement of the piston 12 out of the cylinder 10 for the purpose of drawing in liquid is an adjustable stop, where a threaded spindle 20 serves to adjust it and therefore to adjust the dispensing volume.

The threaded spindle 20 extends parallel to the cylinder axis. It is mounted to rotate 22 in a fixed axial position relative to the cylinder 10. The threaded spindle 20 has an outside thread. The adjustable stop 16 is screwed onto the threaded spindle 20 by means of a threaded sleeve 26, which has a matching inside thread, and guided 32 to prevent twisting 30. The adjustable stop 16 is axially adjusted by turning the threaded spindle 20.

To turn the threaded spindle 20 and therefore adjust the dispensing volume, there is a rotating knob 34 at the top end of the threaded spindle 20. The rotating knob 34 has a cylindrical pot shape with an opening towards the bottom. It is mounted to rotate around a center cylinder axis 36 and has an axial gearing 38 on its inside mantle, which meshes with a corresponding axial gearing 40 at the top end of the threaded spindle 20. The manually activated rotation of the rotating knob 34 is translated into a fast rotation of the threaded spindle 20.

The dispenser has a digital volume display by means of a counter mechanism 42, which is coupled with the threaded spindle 20 by means of a gear mechanism. The gear mechanism is a bevel wheel gear.

A first bevel wheel 44 sits rigidly on the threaded spindle 20, and a second bevel wheel 48 sits rigidly on the counter mechanism shaft 46, with a normally rigid torque transfer connection existing between them. If the rotating knob 34 is turned and the adjustable stop 16 and therefore the dispensing volume of the dispenser are adjusted, a proportional adjustment of the counter mechanism 42 for a display of the dispensed volume takes place.

The dispenser has a basic setting provided by the manufacturer, at which the displayed volume and volume actually dispensed agree for deionized water under normal conditions. A manufacturer's conformity certificate to this effect is provided.

Under certain circumstances, i.e. when liquids which have a viscosity that deviates greatly from that of water are dispensed, deviations between the liquid volume displayed and that actually dispensed can occur. The user then has the possibility of subsequently adjusting the dispenser, in order to produce agreement between the liquid volume displayed and that actually dispensed once again. The subsequent adjustment takes place in that the user measures the liquid volume actually dispensed and adjusts the volume display to the measured value.

In order to be able to access the counter mechanism 42 during the adjustment process, the user must open a slide 50. The rotating knob 34 has a gear crown 52 at the bottom of the inside mantle, and the slide 50 has a lug 54, which moves into the gear crown 52 and thereby locks the rotating knob 34 in place. This ensures that the rotating knob 34 and the adjustable stop 16 do not undergo any position change during the adjustment process.

When the slide 50 is open, a spacer 56 becomes accessible, which locks the bevel wheel 48 in place on the counter mechanism shaft 46, in engagement with the bevel wheel 44 on the threaded spindle 20. The spacer 56 consists of colored plastic. It lies behind a thin plastic strip 58 which acts as a seal, is attached to one of the bearing blocks 64 for the counter mechanism shaft 46, and covers the spacer 56.

The plastic strip 58 takes a position behind a window 60, through which the volume display of the counter mechanism 42 is visible, in which it covers the spacer 56. When the spacer 56 is first pulled off the gear mechanism shaft 46, the plastic strip 58 is torn off and the colored spacer 56 becomes visible through the window 60.

When the slide 50 is open, a setting knob 62 seated on the counter mechanism shaft 46 becomes visible; when the slide 50 is closed, there is no access to this knob. After pulling the spacer 56 off, the counter mechanism shaft 46 can be moved out of engagement with the bevel gears 44, 48, and adjusted by means of the setting knob 62, in order to bring the volume display into agreement with the liquid volume measured by the user, which has actually been dispensed. Then the counter mechanism shaft 46 is brought back into engagement with the bevel wheels 44, 48, and the spacer 56 is put into place again.

The spacer 56, which has become visible as a colored marking in the display field of the dispenser, allows the user to see at a glance that this dispenser has been adjusted, and that its volume display deviates from the basic setting provided by the manufacturer.

What is claimed is a:

1. Bottle top dispenser with a piston-cylinder unit, the piston and cylinder of which can be activated in an axial stroke movement relative to one another, in order to draw liquid from a bottle on which the dispenser is set, and dispense it, with an adjustable limiter for the maximum axial elongation of the piston and cylinder relative to one another, and with a volume display proportional to the limiter setting, characterized in that the dispenser is adjustable, by setting it, in a condition where the limiter and the volume display are independent of one another, in order to bring the displayed volume and the volume actually dispensed into agreement.

2. Bottle top dispenser according to claim 1, characterized in that the limiter acts mechanically, that the volume display takes place mechanically, and that there is a mechanical gear connection between the limiter and the volume display, which can be uncoupled and recoupled.

3. Bottle top dispenser according to claim 2, characterized in that the limiter has a first stop (16), which limits the piston-cylinder stroke during intake, and a second stop (14), which limits the piston-cylinder stroke while dispensing, and that the first stop (16) or the second stop (14) or the volume display is adjustable for making an adjustment in the uncoupled state of the limiter and the volume display.

4. Bottle top dispenser according to claim 3, characterized in that one of the stops (16) is an adjustable stop for volume adjustment, and that the adjustable stop is held in place in the uncoupled state of the limiter and the volume display, and the volume display can be adjusted, in order to make the adjustment.

5. Bottle top dispenser according to claim 4, characterized in that it has a rotating knob (34) for adjusting the volume, on which a gear crown (52) is arranged, that the volume display is located behind a closure which must be opened to make the adjustment, and that when the closure is opened, a lug (54) or the like which is located on it moves into the gear crown (52) and locks the rotating knob (34) in place.

6. Bottle top dispenser according to claim 2, characterized by a volume display by means of a counter mechanism (42), the counter mechanism shaft (46) of which is coupled, via a bevel wheel gear, to a threaded spindle (20), which is subject to a rotation proportional to the limiter setting, and that the counter mechanism shaft (46) is locked in place by means of a removable spacer (56), in the engagement position of the bevel gears (44, 48), and can be moved out of engagement with the bevel gears (44, 48) after the spacer (56) has been released, and can be turned by means of a setting knob (62).

7. Bottle top dispenser according to claim 6, characterized in that the spacer (56) is secured with a plastic strip (58), which is torn off when the spacer (56) is first released, and allows the marking to become visible.

8. Bottle top dispenser according to claim 7, characterized in that the plastic strip (58) is located in the volume display field of the dispenser, in front of the spacer (56), and covers the spacer (56), and allows the spacer (56) itself to become visible as a marking after it is torn off.

9. Bottle top dispenser according to claim 1, characterized in that it has a seal which is broken at the first adjustment.

10. Bottle top dispenser according to claim 9, characterized in that a noticeable marking becomes visible in the volume display field of the dispenser after the seal has been broken.

* * * * *